(12) United States Patent
Tang

(10) Patent No.: US 8,841,808 B2
(45) Date of Patent: Sep. 23, 2014

(54) HEAT-DISSIPATION STRUCTURE FOR MOTOR

(75) Inventor: Songfa Tang, Zhongshan (CN)

(73) Assignee: Zhongshan Broad-Ocean Motor Manufacturing Co., Ltd., Zhongshan (CN)

( * ) Notice: Subject to any disclaimer, the term of this patent is extended or adjusted under 35 U.S.C. 154(b) by 210 days.

(21) Appl. No.: 13/248,050

(22) Filed: Sep. 29, 2011

(65) Prior Publication Data

US 2012/0080966 A1   Apr. 5, 2012

(30) Foreign Application Priority Data

Oct. 1, 2010   (CN) .................... 2010 2 0557433 U

(51) Int. Cl.
*H02K 5/00*     (2006.01)
*H02K 9/00*     (2006.01)
*H02K 5/20*     (2006.01)
*H02K 5/22*     (2006.01)
*H02K 11/00*    (2006.01)
*H02K 5/15*     (2006.01)

(52) U.S. Cl.
CPC .. *H02K 5/22* (2013.01); *H02K 5/20* (2013.01); *H02K 5/15* (2013.01); *H02K 11/0073* (2013.01)
USPC .................................. 310/89; 310/52; 310/59

(58) Field of Classification Search
CPC ........................................................ H02K 5/20
USPC .................................. 310/52, 58, 59, 64, 89
IPC .................... H02K 5/20,9/02, 9/28, 5/00, 5/02, H02K 5/04
See application file for complete search history.

(56) References Cited

U.S. PATENT DOCUMENTS 3,143,897 A  *  8/1964  Kohn ........................ 74/606 R
6,577,030 B2 *  6/2003  Tominaga et al. .......... 310/68 B
(Continued)

FOREIGN PATENT DOCUMENTS

| JP | 2004017887 A | * | 1/2004 |
| JP | 2009050062 A | * | 3/2009 |
| JP | 2009124829 A | * | 6/2009 |

OTHER PUBLICATIONS

Machine Translation, JP 2009050062 A, Mar. 5, 2009.*

(Continued)

*Primary Examiner* — Tran Nguyen
*Assistant Examiner* — Thomas Truong
(74) *Attorney, Agent, or Firm* — Matthias Scholl P.C.; Matthias Scholl

(57) ABSTRACT

A heat-dissipation structure for a motor including a motor shell, a control box, and a coupling shell. One end of the coupling shell is connected to the bottom of the motor shell and the other end thereof is connected to the top of the control box and a plurality of air vents are arranged on a side wall of the coupling shell. The introduction of the coupling shell enlarges the inner space of the control box and achieves rapid heat dissipation and a better heat dissipation effect. The heat-dissipation structure features rapid heat dissipation, excellent heat dissipation effect, a simple structure, an attractive shape, and great universality.

8 Claims, 6 Drawing Sheets

(56) References Cited

U.S. PATENT DOCUMENTS

| | | | |
|---|---|---|---|
| 6,593,674 B2 * | 7/2003 | Sanchez et al. | 310/89 |
| 6,661,140 B2 * | 12/2003 | Agnes et al. | 310/89 |
| 6,750,578 B2 * | 6/2004 | Buening et al. | 310/89 |
| 6,861,775 B2 * | 3/2005 | Lau | 310/71 |
| 7,362,017 B2 * | 4/2008 | Piper et al. | 310/63 |
| 7,414,339 B2 * | 8/2008 | Kitamura et al. | 310/68 D |
| 2002/0063482 A1 * | 5/2002 | Leslie | 310/89 |

OTHER PUBLICATIONS

Machine Translation, JP 2009124829 A, Jun. 4, 2009.*
Machine Translation, JP 2004017887 A, Jan. 22, 2004.*

* cited by examiner

HEAT-DISSIPATION STRUCTURE FOR MOTOR

CROSS-REFERENCE TO RELATED APPLICATIONS

Pursuant to 35 U.S.C. §119 and the Paris Convention Treaty, this application claims the benefit of Chinese Patent Application No. 201020557433.4 filed Oct. 1, 2010, the contents of which are incorporated herein by reference.

BACKGROUND OF THE INVENTION

1. Field of the Invention

The invention relates to a heat-dissipation structure for a motor.

2. Description of the Related Art

A conventional DC brushless motor includes a motor and a control box. The control box is a cast aluminum piece directly mounted on the rear cover of the motor. Inside the control box, there is a circuit board, on which electronic components are mounted. Since conventional control boxes are a sealed structure, electronic components mainly dissipate heat by contacting the inner wall of the control box, having disadvantages of poor heat dissipation effect and abnormal operation.

To solve the heat dissipation problem, air vents are usually arranged on the surface of the aluminum-cast control boxes to increase air convection. However, it has the following disadvantages: apart from complicated manufacturing process and high manufacturing cost of moulds for air vents arranged along the circumferential direction of a control box, the air vents have a poor heat dissipation effect, unattractive appearance, poor universality and the circuit board's embedding process will be affected.

SUMMARY OF THE INVENTION

In view of the above-described problems, it is one objective of the invention to provide a heat-dissipation structure for a motor that has rapid heat dissipation, excellent heat dissipation effect, a simple structure, an attractive shape, and great universality.

To achieve the above objective, in accordance with one embodiment of the invention, there is provided a heat-dissipation structure for a motor comprising a motor shell, a control box, and a coupling shell, wherein one end of the coupling shell is connected to the bottom of the motor shell and the other end thereof is connected to the top of the control box and a plurality of air vents are arranged on a side wall of the coupling shell.

In a class of this embodiment, the motor shell comprises a front end cover, a columnar shell, and a rear end cover; the columnar shell is arranged with a plurality of air vents; the bottom of the rear end cover is arranged with a convex plate; and one end of the coupling shell is sheathed with the convex plate.

In a class of this embodiment, the rear end cover is arranged with a ventilation slot; the cavities of the columnar shell and the coupling shell are connected via the ventilation slot.

In a class of this embodiment, the top of the control box is in an open state with a step arranged along the edge thereof and the other end of the coupling shell is sheathed on the step; on the edge of the top of the control box is raised with a block, which is embedded in a slot of the coupling shell.

In a class of this embodiment, the control box and the coupling shell are connected to the rear end cover via screws.

In a class of this embodiment, inside the control box there mounted with a circuit board, on which electronic components are installed.

In a class of this embodiment, the cavity of the columnar shell is mounted with a stator iron core; and an inner wall of the columnar shell and an outer side wall of the stator iron core are interference fit.

Advantages of the invention are summarized below:

1) the heat-dissipation structure for a motor of the invention is provided with the coupling shell, of which one end is connected with the bottom of the motor shell and the other end is connected to the top of the control box and a plurality of air vents are arranged on the side wall of the coupling shell, thereby enlarging the inner space of the control box and achieve rapid heat dissipation and a better heat dissipation effect;

2) the motor shell comprises the front end cover, the columnar shell, and the rear end cover, wherein the columnar shell is arranged with the ventilation slot connecting to the cavity of the columnar shell and the coupling shell, thereby increasing air circulation inside the control box to achieve rapid heat dissipation and a better heat dissipation effect; and 3) the bottom of the rear end cover is arranged with the convex plate, sheathed with one end of the coupling shell; the top of the control box is in an open state with the step arranged along the edge and the other end of the coupling shell is sheathed on the step; the whole appearance is more attractive. As the coupling shell is a welded panel, no need to break the mould and thus it is economical. In addition, the height of the coupling shell is adjustable showing great flexibility and convenient use.

DETAILED DESCRIPTION OF THE EMBODIMENTS

Figure 1:
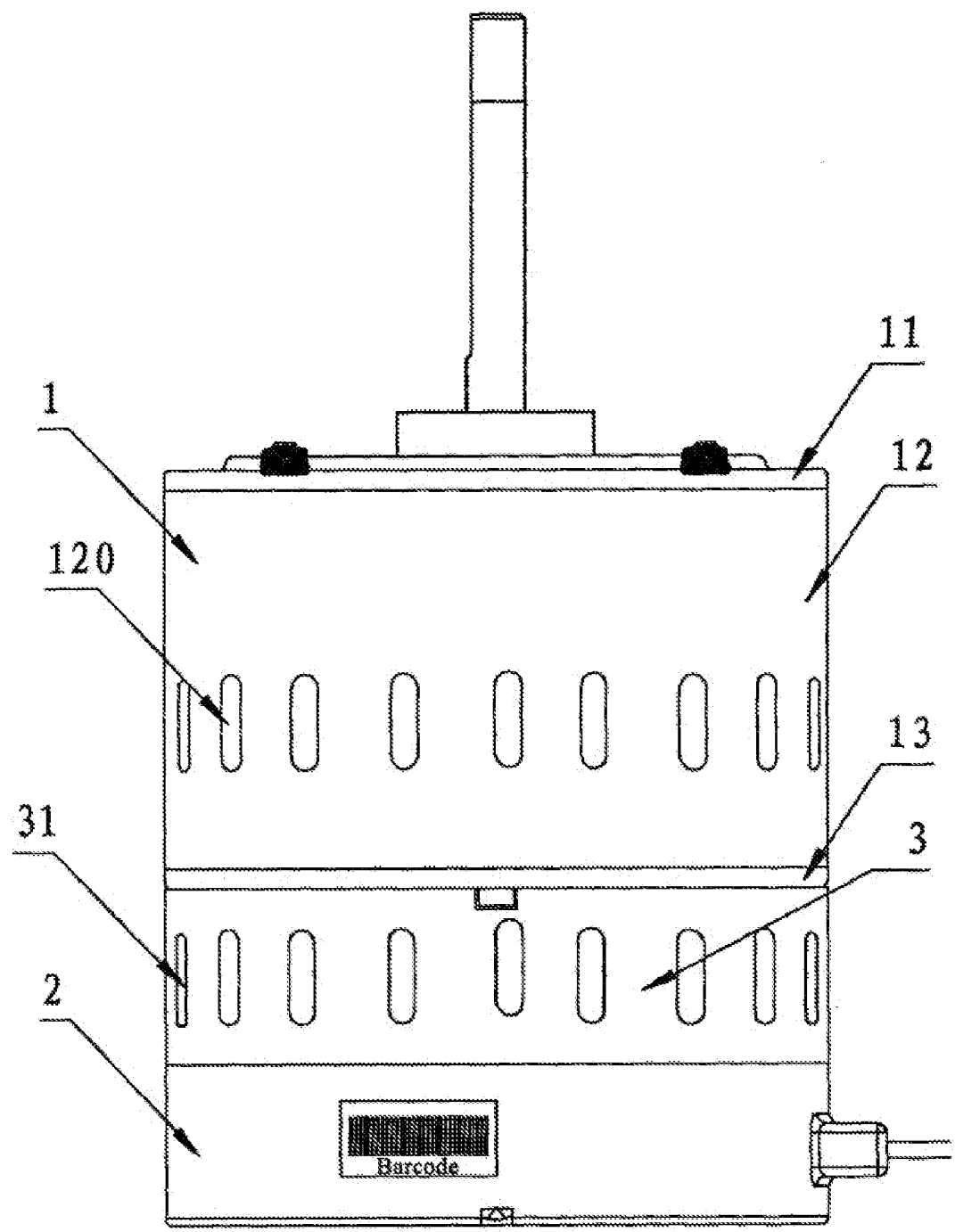
FIG. 1 is a three-dimensional diagram of a heat-dissipation structure for a motor in accordance with one embodiment of the invention.
Figure 2:
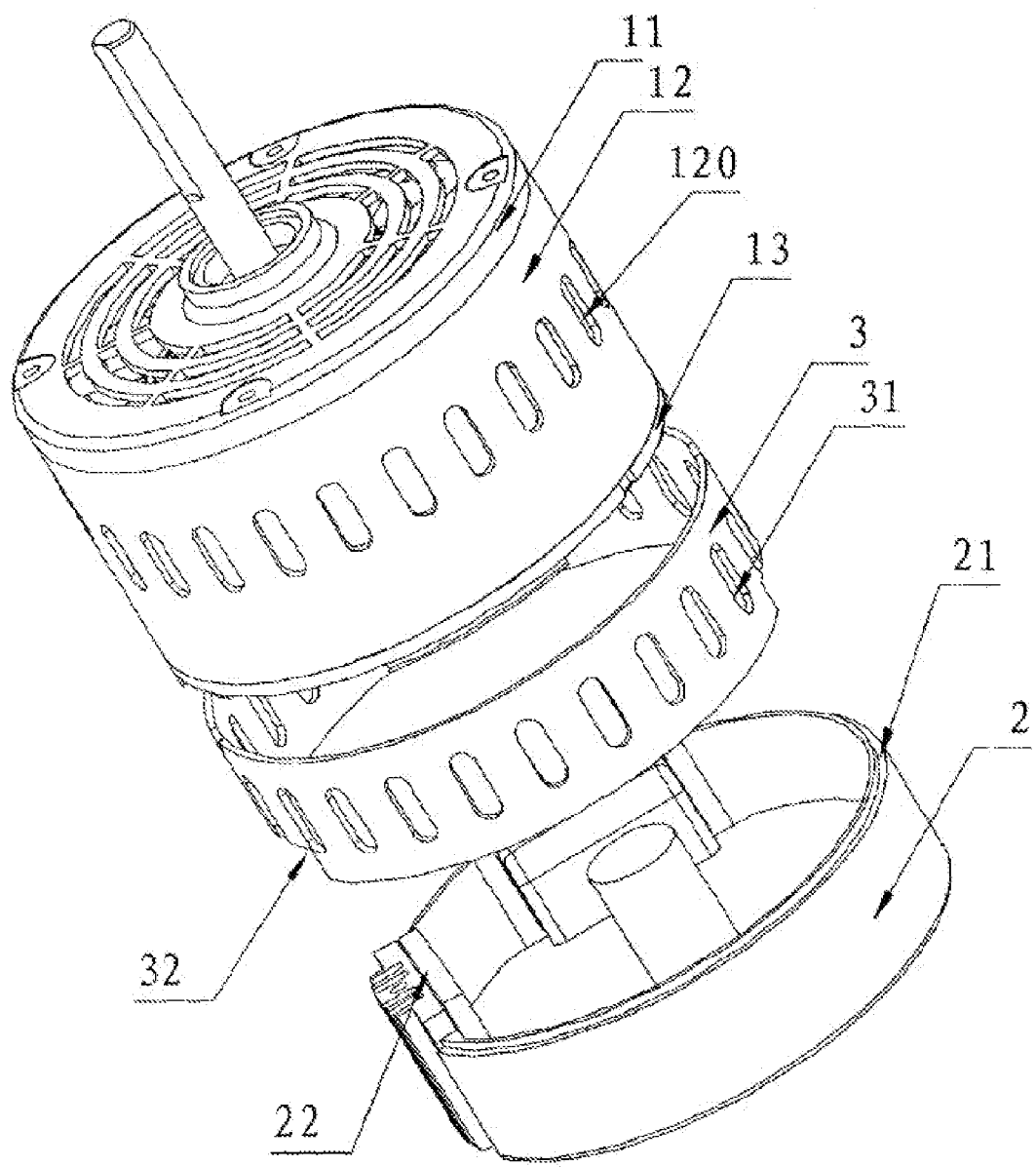
FIG. 2 is an exploded view of a heat-dissipation structure for a motor in accordance with one embodiment of invention.
Figure 3:
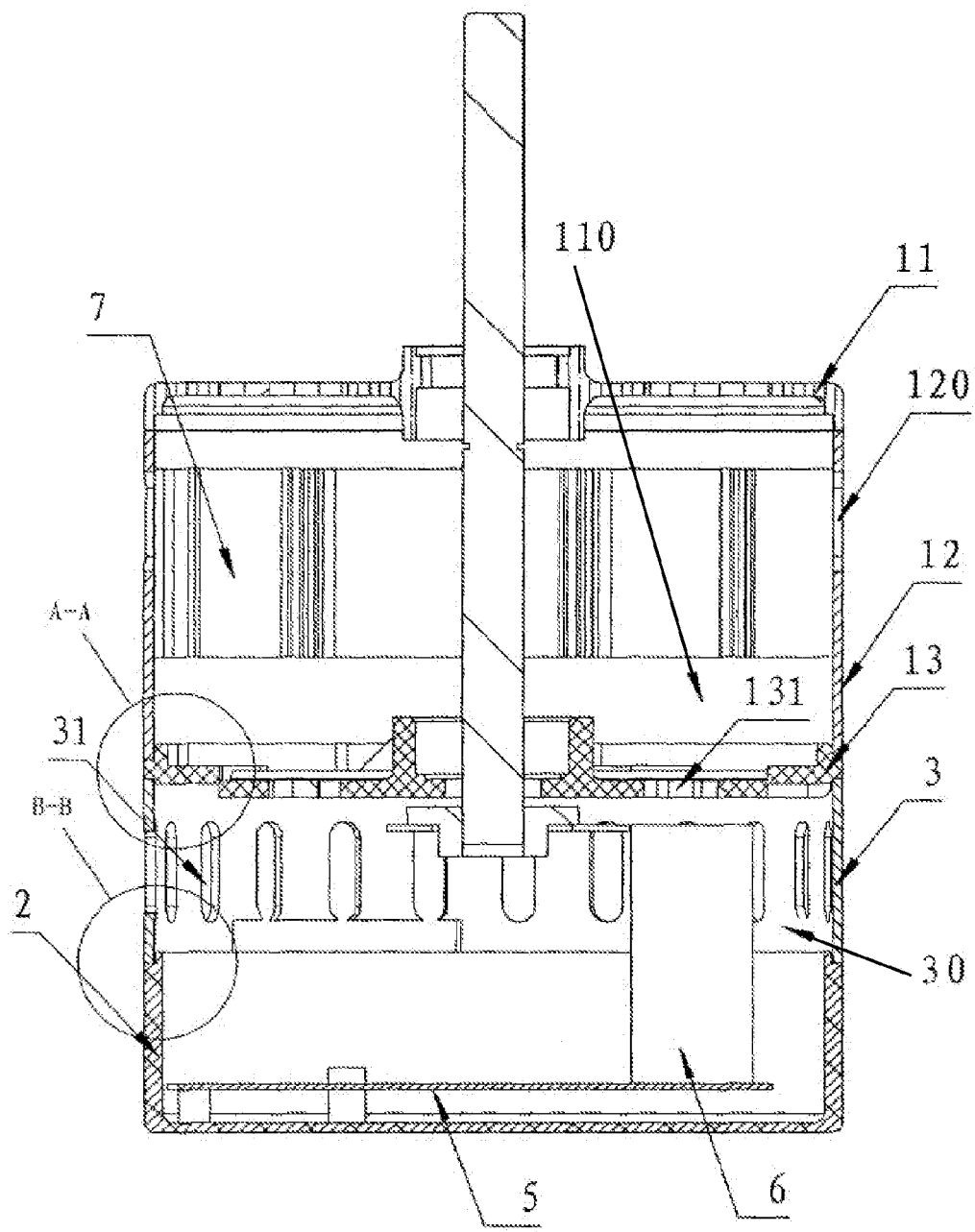
FIG. 3 is a sectional view of a heat-dissipation structure for a motor in accordance with one embodiment of the invention.
Figure 4:
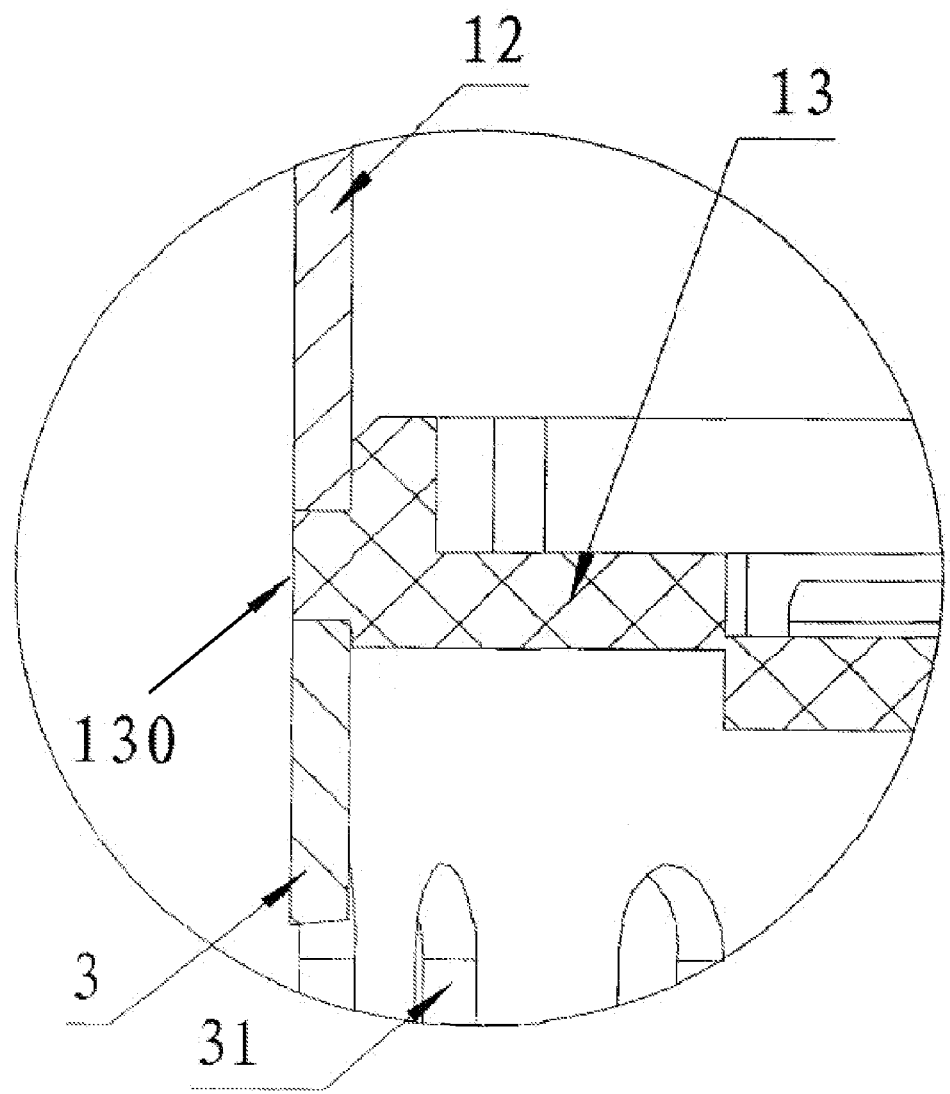
FIG. 4 is an A-A partial enlarged view of FIG. 3.
Figure 5:
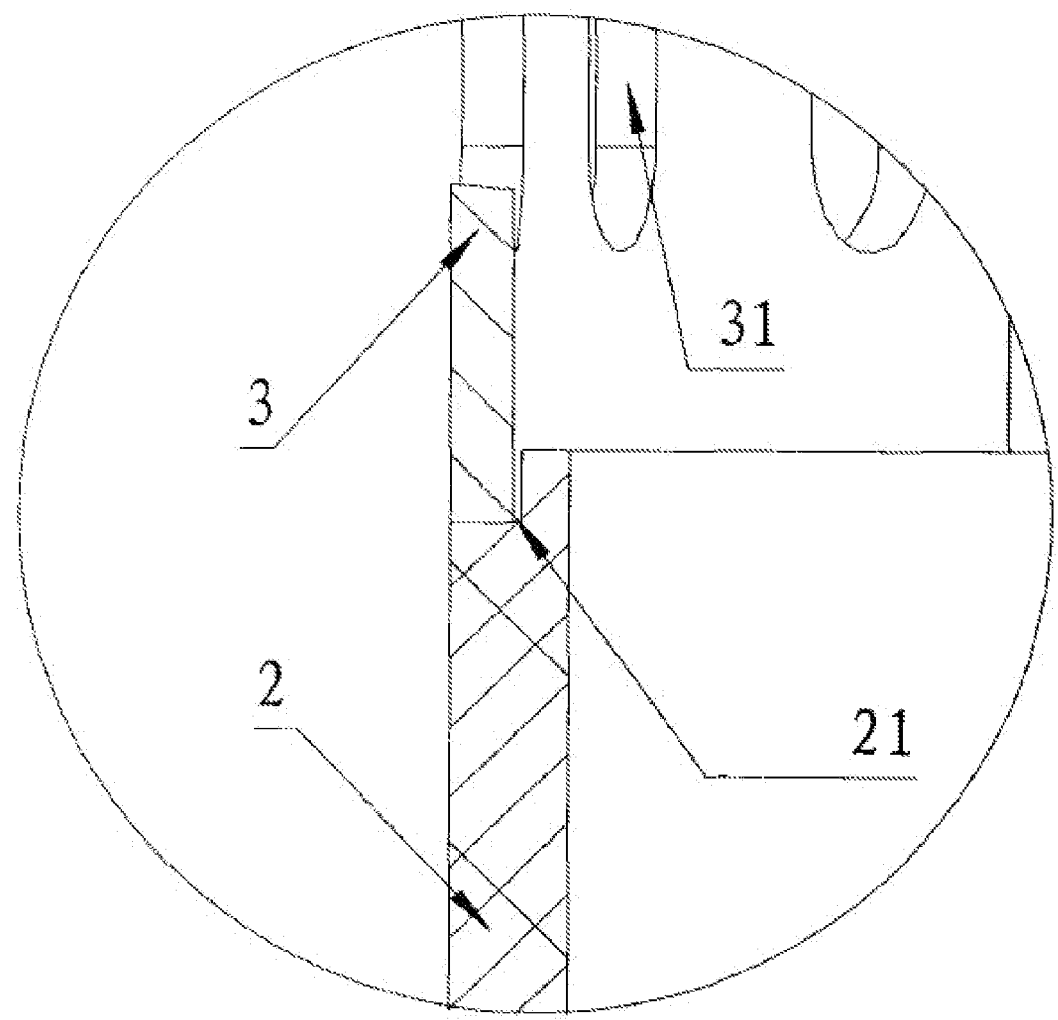
FIG. 5 is a B-B partial enlarged view of FIG. 3.

The invention is explained in further detail below with the aid of the examples and attached drawings.

As shown in FIGS. 1-5, a heat-dissipation structure for a motor in accordance with the invention comprises a motor shell 1, a control box 2, and a coupling shell 3. One end of the coupling shell 3 is connected to the bottom of the motor shell 1 and the other end is connected to the top of the control box 2 and a plurality of air vents 31 are arranged on the side wall of the coupling shell 3. The motor shell 1 comprises a front end cover 11, a columnar shell 12, and a rear end cover 13. The columnar shell 12 is arranged with a plurality of air vents 120, and the bottom of the rear end cover 13 is arranged with a convex plate 130, sheathed with one end of the coupling shell 3. The rear end cover 13 is arranged with a ventilation slot 131, respectively connecting to the cavity 110 of the columnar shell 11 and the cavity 30 of the coupling shell 3. The top of the control box 2 is in an open state with a step 21 arranged along the edge. The other end of the coupling shell 3 is sheathed on the step 21. On the edge of the top of the control box is raised with a block 22, which is embedded in a slot 32 of the coupling shell 3. Inside the control box there mounted with a circuit board 5, on which electronic components 6 are installed. The cavity 110 of the columnar shell 11 is mounted with a stator iron core 7, and inner wall of the columnar shell 11 and outer side wall of the stator iron core 7 are interference fit.

Figure 6:
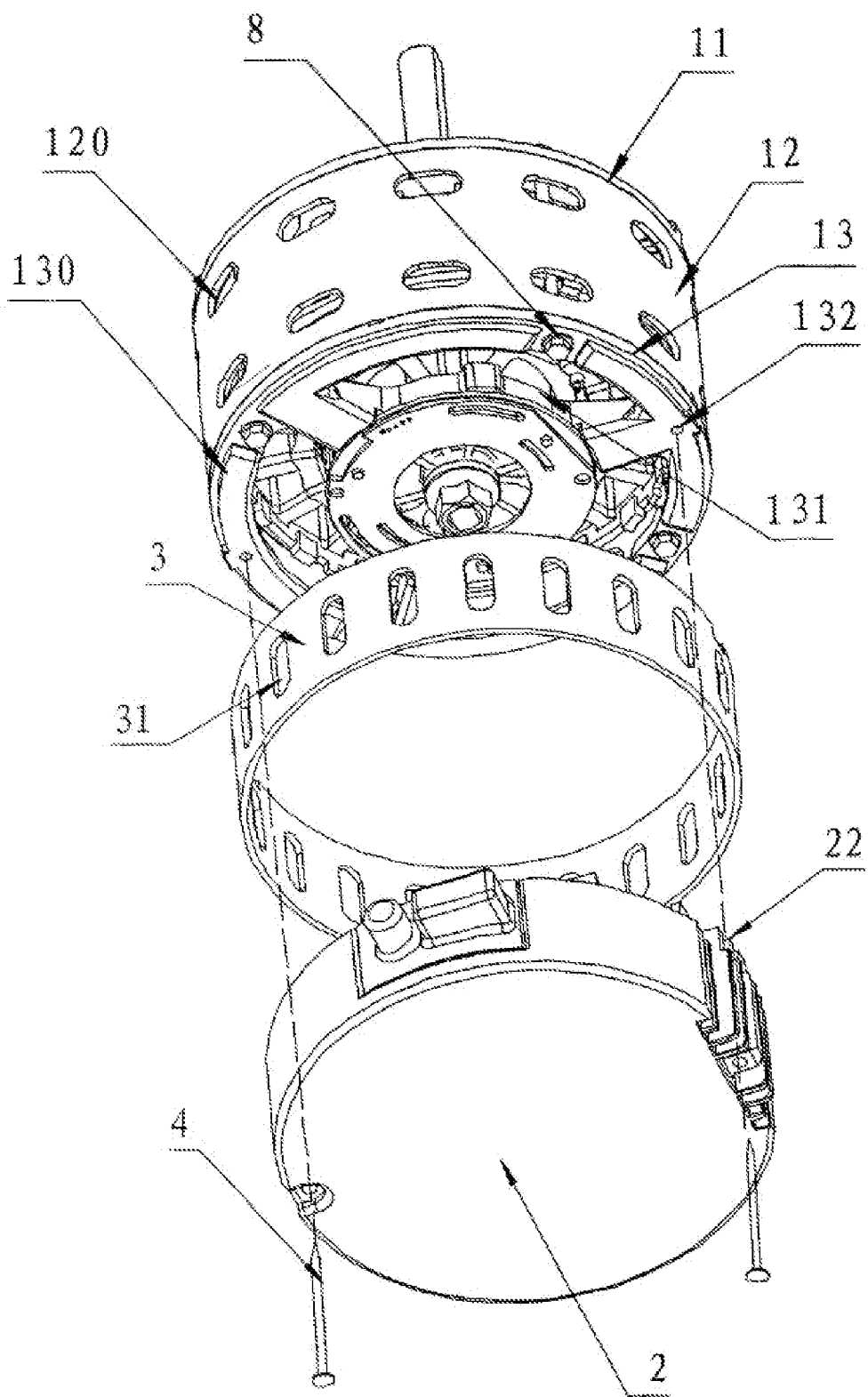
FIG. 6 is an exploded view of a heat-dissipation structure for a motor comprising two rows of air vents arranged on the columnar shell.

As shown in FIG. 6, after the air vents 120 of the columnar shell 12 are arranged in two rows, the control box 2 and the coupling shell 3 are connected to the rear end cover 13 by a screw 4. A screw hole 132 corresponding to the screw 4 is arranged on the rear end cover 13. The front end cover 11, the columnar shell 12, and the rear end cover 13 are connected together by a bolt-nut mechanism 8.

Working principle of the heat-dissipation structure for a motor of the invention is as follows: the heat-dissipation structure is provided with the coupling shell 3, of which one end is connected to the bottom of the motor shell 1 and the other end is connected to the top of the control box 2 and a plurality of air vents 31 are arranged on the side wall of the coupling shell 3. This enlarges the inner space of the control box 2 and achieves rapid heat dissipation and a better heat dissipation effect. The motor shell 1 comprises the front end cover 11, the columnar shell 12, and the rear end cover 13. The columnar shell 12 is arranged with the ventilation slot 131, respectively connecting to the cavity of the columnar shell 12 and the coupling shell 3. This can further increase air circulation inside the control box to achieve rapid heat dissipation and a better heat dissipation effect.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A heat-dissipation structure for a motor, the heat-dissipation structure comprising:
   a) a motor shell, said motor shell comprising a front end cover, a columnar shell, a rear end cover having a bottom, a first plurality of air vents, and a ventilation slot;
   b) a control box for accommodating a circuit board, said control box having a top; and
   c) a coupling shell, said coupling shell comprising a second plurality of air vents and a coupling shell cavity;
wherein:
   said first plurality of air vents is arranged on said columnar shell;
   a convex plate is arranged on the bottom of said rear end cover;
   said ventilation slot is disposed on said rear end cover;
   the top of said control box is open;
   a step is arranged along an edge of the top of said control box;
   said second plurality of air vents is arranged on a side wall of said coupling shell;
   one end of said coupling shell is fixedly sheathed with said convex plate, wherein said coupling shell is fixedly connected to said motor shell;
   the other end of said coupling shell is fixedly sheathed on said step, wherein said coupling shell is fixedly connected to said control box;
   a block is disposed on said edge;
   said block is embedded in a slot of said coupling shell; and
   when in use, air passes through the heat-dissipation structure via said first plurality of air vents and said second plurality of air vents.

2. The heat-dissipation structure of claim 1, wherein a cavity of said columnar shell and a cavity of said coupling shell are connected via said ventilation slot.

3. The heat-dissipation structure of claim 2, wherein said cavity of said columnar shell is mounted with a stator iron core; and an inner wall of said columnar shell and an outer side wall of said stator iron core are interference fit.

4. The heat-dissipation structure of claim 1, wherein said control box and said coupling shell are connected to said rear end cover via a screw.

5. A combination of a heat-dissipation structure for a motor and a circuit board for controlling the motor; the heat-dissipation structure comprising:
   a) a motor shell, the motor shell comprising a front end cover, a columnar shell, a rear end cover comprising a bottom, a first plurality of air vents, and a ventilation slot;
   b) a control box, the control box comprising a top; and
   c) a coupling shell, the coupling shell comprising a first end, a second end, a side wall, a second plurality of air vents, and a coupling shell cavity;
wherein:
   the circuit board is disposed in the control box;
   the first plurality of air vents is arranged on the columnar shell;
   a convex plate is arranged on the bottom of the rear end cover;
   the ventilation slot is disposed on the rear end cover;
   the top of the control box is open;
   a step is arranged along an edge of the top of the control box;
   the second plurality of air vents is arranged on the side wall of the coupling shell;
   the first end of the coupling shell is fixedly sheathed with the convex plate, wherein the coupling shell is fixedly connected to the motor shell;
   the second end of the coupling shell is fixedly sheathed on the step, wherein the coupling shell is fixedly connected to the control box;
   a block is disposed on the edge;
   the block is embedded in a slot of the coupling shell; and
   when in use, air passes through the heat-dissipation structure via said first plurality of air vents and said second plurality of air vents.

6. The combination of claim 5, wherein a cavity of the columnar shell and a cavity of the coupling shell are connected via the ventilation slot.

7. The combination of claim 6, wherein:
   the cavity of the columnar shell is mounted with a stator iron core; and
   an inner wall of the columnar shell is in interference fit with an outer side wall of the stator iron core.

8. The combination of claim 5, wherein the control box and the coupling shell are connected to the rear end cover via a screw.

* * * * *